United States Patent
Comacchio et al.

(10) Patent No.: US 9,500,048 B2
(45) Date of Patent: Nov. 22, 2016

(54) DRILLING MACHINE WITH CAROUSEL-TYPE DRILL STEM AND SHROUD TUBE LOADER

(75) Inventors: Pasqualino Comacchio, Riese Pio X (TV) (IT); Patrizio Comacchio, Riese Pio X (TV) (IT); Renzo Comacchio, Riese Pio X (TV) (IT)

(73) Assignee: COMACCHIO INTERNATIONAL S.A., Lugano (CH)

( * ) Notice: Subject to any disclaimer, the term of this patent is extended or adjusted under 35 U.S.C. 154(b) by 1006 days.

(21) Appl. No.: 12/299,308

(22) PCT Filed: May 9, 2006

(86) PCT No.: PCT/IT2006/000335
§ 371 (c)(1),
(2), (4) Date: Mar. 12, 2010

(87) PCT Pub. No.: WO2007/129337
PCT Pub. Date: Nov. 15, 2007

(65) Prior Publication Data
US 2010/0200297 A1    Aug. 12, 2010

(51) Int. Cl.
E21B 19/14    (2006.01)
F24J 3/08    (2006.01)

(52) U.S. Cl.
CPC ........ *E21B 19/146* (2013.01); *F24J 2003/088* (2013.01)

(58) Field of Classification Search
CPC .... E21B 19/146; E21B 19/00; E21B 21/015; F24J 2003/088
USPC .............. 175/52, 51, 202, 220, 85; 166/85.1
See application file for complete search history.

(56) References Cited

U.S. PATENT DOCUMENTS

| | | | | |
|---|---|---|---|---|
| 4,445,579 A * | 5/1984 | Bello | | 175/52 |
| 4,892,160 A * | 1/1990 | Schivley et al. | | 175/85 |
| 5,263,545 A | 11/1993 | Tudora | | |
| 5,423,390 A * | 6/1995 | Donnally et al. | | 175/85 |
| 5,954,209 A * | 9/1999 | Wurm et al. | | 211/70.4 |
| 6,615,932 B2 * | 9/2003 | Huhdanmaki et al. | | 175/52 |
| 2002/0117335 A1 | 8/2002 | Koch et al. | | |

FOREIGN PATENT DOCUMENTS

| | | |
|---|---|---|
| DE | 10341437 | 4/2005 |
| EP | 0379187 | 7/1990 |
| JP | 62-194390 | 8/1987 |

OTHER PUBLICATIONS

Anonymous, Crawler Drill Rig AN 140, Internet Article [Online], Jan. 12, 2004, XP002418094, Retrieved fom the internet: http://tadrilling.co.uk/products/piling/pilingequip/an140pdf.pdf (The whole document).

* cited by examiner

*Primary Examiner* — Yong-Suk (Philip) Ro
(74) *Attorney, Agent, or Firm* — Themis Law

(57) ABSTRACT

A drilling machine, particularly for use in non-rocky terrain, includes a machine body with a mast equipped with one or more rotary operating heads having chucks coupled thereto for the downward rotation of drill stem modules and/or shroud tube modules, and a carousel loader of the drill stem modules. Each of the drill stem modules is inserted in a shroud tube module and is carried on a sliding platform. The drilling machine further includes a loader having a plurality of rods, forks, sockets, or seats, suitable for inducing a forward transfer of the shroud tube modules and corresponding drill stem modules in a substantially vertical position.

15 Claims, 7 Drawing Sheets

DRILLING MACHINE WITH CAROUSEL-TYPE DRILL STEM AND SHROUD TUBE LOADER

This patent relates to drilling machines, particularly for geothermal energy systems, and especially concerns a well drilling machine, with a new carousel-type drill stem and shroud tube loader.

Increasing use is being made of geothermal energy systems, which exploit the planet's endogenous heat that, in addition to being absorbed by the ground, is also absorbed by ground water and can consequently be exploited in geothermal energy systems.

Known high- and low-enthalpy geothermal energy systems require one or more geothermal heat probes to be inserted deep in the ground for heat exchange, and connected to a tank or outside utility, such as a turbine or a heat pump.

When used for heating civil or industrial buildings, in particular, such geothermal energy systems are generally installed inside buildings and in residential areas, and the drilling must be done in the adjacent courtyards.

Heat exchange with the ground and/or groundwater thus takes place by means of said geothermal heat probes, which are installed in suitably prepared wells with a diameter of approximately 10 cm.

Known geothermal heat probes consist of twin tubes, one for the downward flow and one for the return flow, preferably joined together to form a closed U-shaped circuit. The number of geothermal energy systems being installed is increasing enormously, and in some countries they are even preferred to the usual methane gas or diesel oil heating systems.

One of the factors hindering the large-scale diffusion of systems of this type is the high cost of drilling, and particularly the costs relating to the drilling equipment and manpower.

To drill such wells for the installation of heat probes, the drilling machinery involved is fitted with a drilling tool attached to the machine body by means of a specific drill stem.

Said drill stem is hollow and consists of several hollow tubular modules (hereinafter called stem modules) with threaded joints, i.e. which screw one into another.

The modules comprising said drill stem are each around 2-4 meters long and are progressively screwed one into the other as the drilling work proceeds.

To complete the drilling in non-rocky soils, it is also necessary to use shroud tubes to support the walls of the well during the drilling process.

Said shroud tubes have much the same diameter as that of the well being drilled and are driven progressively into the ground as the drilling proceeds.

Said shroud tubes, like the drill stems, also consist of several casing modules that are joined together by means of threaded couplings, i.e. they screw one into the other.

To be more precise, each drill stem module is inserted inside a corresponding shroud tube module and, as the drilling proceeds, said shroud tube module and the drill stem module it contains are simultaneously driven into the ground.

The drilling tool is initially connected to the machine body by means of the first drill stem module, inserted in the corresponding first shroud tube module.

The drilling machine performs the drilling by imposing a downward rotary motion on said drill stem module, and consequently also on the drilling tool.

When the well has been drilled to a depth such that said drill stem module has been almost completely driven into the ground, the drilling process is interrupted and another drill stem module and shroud tube module have to be connected before the drilling can continue.

This procedure is repeated until the drilling tool reaches the required depth, i.e. until the depth of the drilled well reaches the specified level.

The drill stem and shroud tube assembly procedure is completed manually by one or more operators.

Some known drilling machines are fitted with special means for loading the drill stem modules alone, using mechanical arm systems that pick up a module and align it with the module already driven into the ground.

There are known drilling machines with magazine-type loaders, with or without additional mechanical arms for positioning only the drill stem modules, which cannot be combined with the shroud tubes.

The main object of the present patent is a well drilling machine with new carousel-type means for loading both the drill stems and the shroud tubes.

The main technical purpose of the present invention is to drill wells, e.g. for the installation of geothermal heat probes, in non-rocky ground.

Another object of the present invention is to automate the process for loading both the drill stems and the shroud tubes.

Another object of the present invention is to automate the process for adjusting the position inside the loader of both the drill stems and the shroud tubes, which are pulled out of the ground at the end of the drilling process.

Another object of the present invention is to limit the noise emissions and consequently the acoustic pollution produced during well drilling operations.

One of the advantages of the present invention lies in that it can also be used in restricted spaces because it is compact in shape and limited in size.

Another advantage of the present invention is that its use requires only one operator, thereby reducing labor costs.

Another, not necessarily last advantage of the present invention lies in a reduction of the time it takes to bring the drill stems and shroud tubes into position and consequently in the time it takes to complete the drilling process.

These and other direct and complementary objects are achieved by the new machine for drilling wells, e.g. for the installation of geothermal energy systems, in non-rocky terrain with a new carousel-type drill stem and shroud tube loader.

The new drilling machine consists mainly of a compact machine body with wheels, preferably of the track type, and comprises at least one mast with at least one mobile operating head, and devices for picking up and positioning drill stems and shroud tubes, and at least one carousel-type loader of the modules comprising said drill stems and of the modules comprising said shroud tubes.

To be more precise, the new drilling machine comprises at least one main operating head for imposing a downward rotary motion on said drill stem module and comprising at least one chuck for coupling with the upper end of said drill stem module.

The new drilling machine also comprises a further auxiliary operating head, situated below said main operating head, with at least one chuck for coupling with the upper end of the shroud tube module, wherein said auxiliary operating head keeps said shroud tube module centered with said drill stem and in a position aligned with the direction in which the well is being drilled.

Said main operating head serves the purpose of imposing a downward rotary motion on the drill stem module in order to screw in and thereby connect the drill stem module to another drill stem module already driven into the ground and thus enable the well drilling to continue.

The downward movement of the drill stem module is accompanied by the downward movement of the shroud tube module, which is likewise connected to the shroud tube already driven into the ground.

Basically, said drill stem module and said shroud tube module are driven into the ground together, i.e. one inserted inside the other.

The new loader of said drill stem modules and said shroud tube modules consists of a platform and one or more belts or chains forming a ring that slide between two or more tensioning shafts or pins, wherein said tensioning shafts or pins are solidly attached and substantially perpendicular to said platform.

Said sliding belts or chains comprise a plurality of rods, forks, sockets or other seats evenly distributed over their outer surface and suitable for retaining said shroud tube modules in a vertical position, each containing a corresponding drill stem module. Each drill stem module and shroud tube module are consequently coupled together and inserted in the same fork or socket, or seat in general, that is solidly attached to said belts or chains and slides perpendicular to said platform.

The new drilling machine is complete with linkage for moving the mast, which ensures that the angle between the mast and the platform for loading the drill stems and shroud tubes remains perpendicular so that, when in the working stage, the platform comes to occupy a horizontal position. Said horizontal position of the loader platform guarantees the vertical stability of the drill stems and shroud tubes.

The new drilling machine thus also comprises one or more jacks that, during the positioning stage prior to drilling, serves the purpose of arranging said platform in a preferably horizontal position, such that said drill stem modules and shroud tube modules are preferably vertical, though different angles are allowable providing the stability of the tubes and stems is assured.

Thus, even for drilling operations in sloping terrain or on a gradient, the new drilling machine drills wells in a substantially vertical direction.

Said tensioning shafts or pins rotate around their own vertical axis, inducing the rotation of one or more geared wheels solidly attached thereto.

The sliding belts or chains are driven by said geared wheels, and consequently slidingly cause the displacement of said drill stem modules and corresponding shroud tube modules inserted in said seats or forks solidly attached to said sliding belts or chains.

Inside said loader there is at least one pickup position, which is the position from which a shroud tube module, coupled with a corresponding drill stem module, is collected.

After a collection has been made, said shafts undergo a controlled rotation that moves said sliding belts forward so as to bring another shroud tube module, complete with the corresponding drill stem module, into the same pickup position for subsequent collection.

Said loader for the new drilling machine also comprises at least one device or clamp for locking the drill stem modules and shroud tube modules during the stages for the collection of said modules and for the repositioning of said further modules ready for collection by the loader.

Said clamp serves the purpose of retaining the drill stem module and/or shroud tube module during the screwing/unscrewing of the operating head on the corresponding module.

Unlike automatic loaders of known type, the new loader produces little noise because the modules are not displaced by the effect of gravity, i.e. by dropping them, they instead undergo a controlled sliding transfer.

The design of the loader is substantially rectangular in shape, developing mainly in the longitudinal direction.

The loader is consequently compact in shape and the new drilling machine is, on the whole, extremely manageable.

Given its low noise and compact features, the new drilling machine can also be used in restricted spaces, such as small private gardens and residential areas.

Moreover, thanks to the total automation of the device for loading both the drill stem modules and the shroud tube modules, the present invention can easily and effectively be handled by a single operator, even with the aid of a remote control, with a consequent reduction in labor costs.

The characteristics of the well drilling machine, particularly suitable for non-rocky terrain, with the new carousel loader, will be better clarified in the following description with reference to the drawings, which are provided as a non-restrictive example.

Figure 4:
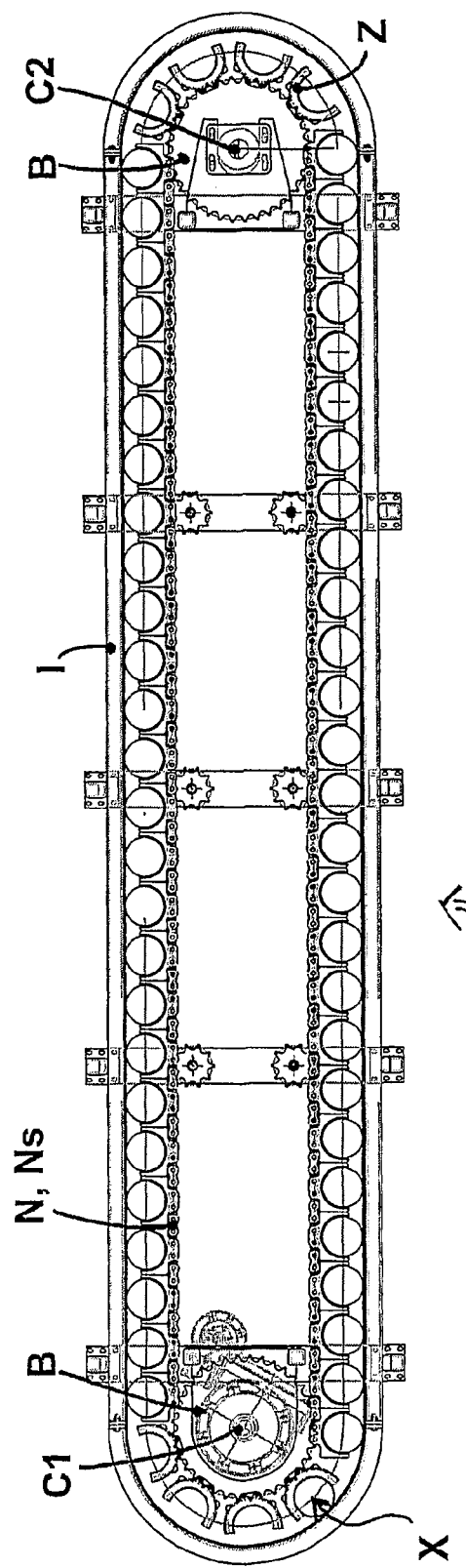
Figure 5:
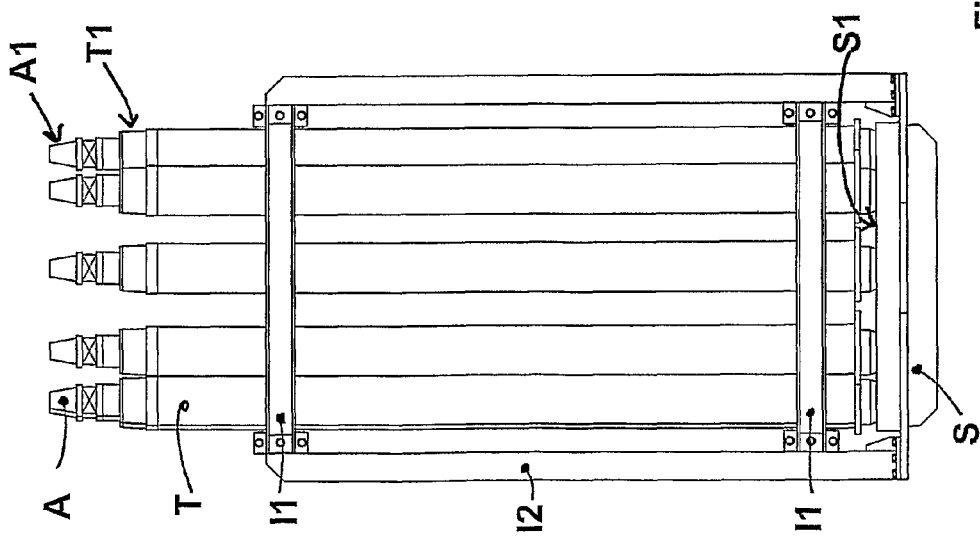

FIGS. 4 and 5 respectively show plan and front views of the new carousel loader (C).

Figure 6A:
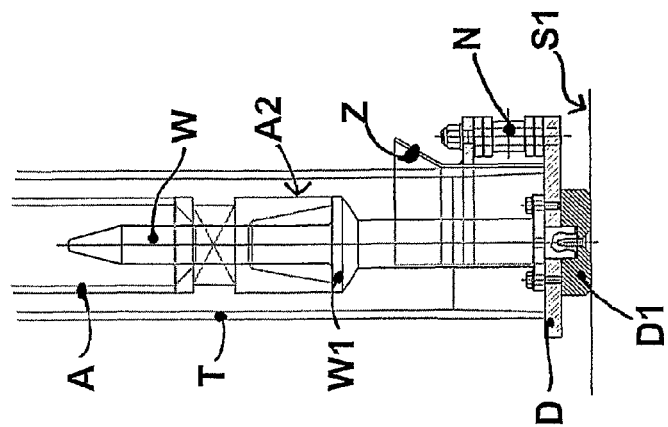
Figure 6:
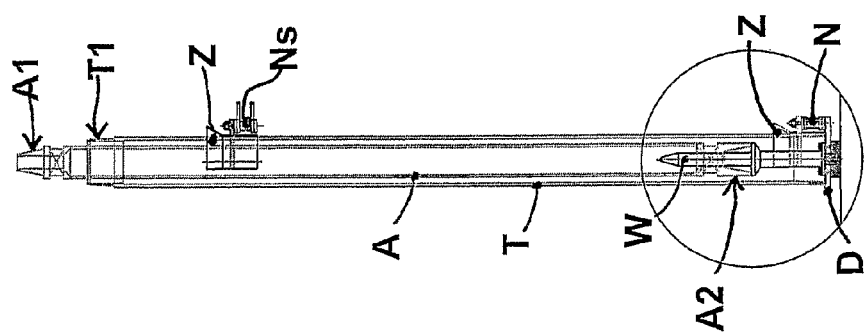

FIG. 6 shows the device for supporting and sliding a drill stem module (A) and shroud tube module (T), while FIG. 6a shows a detail of the part of the loader (C) nearest to the platform (S).

Figure 7:
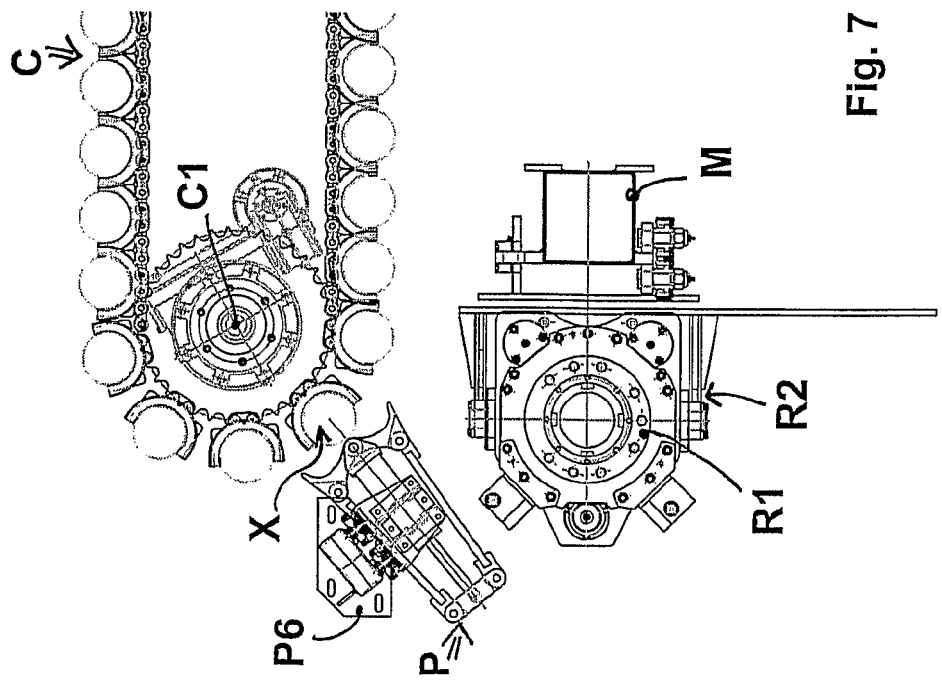

FIG. 7 shows a top view of part of the loader (C), the mast (M) with the operating heads and the locking clamp (P).

Figure 8B:
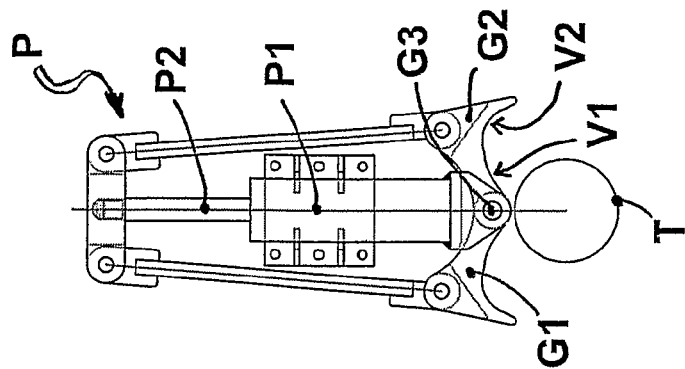
Figure 8A:
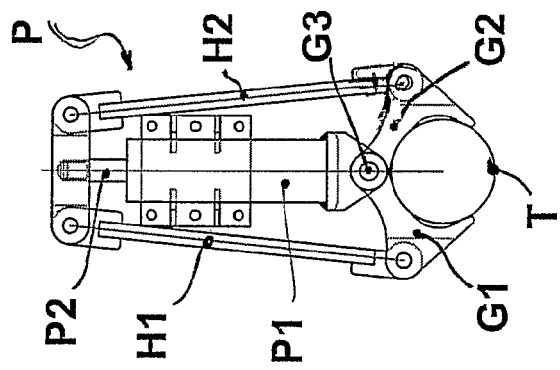

FIGS. 8a and 8b respectively show a detail of said clamp (P) when closed and open.

Figure 9:
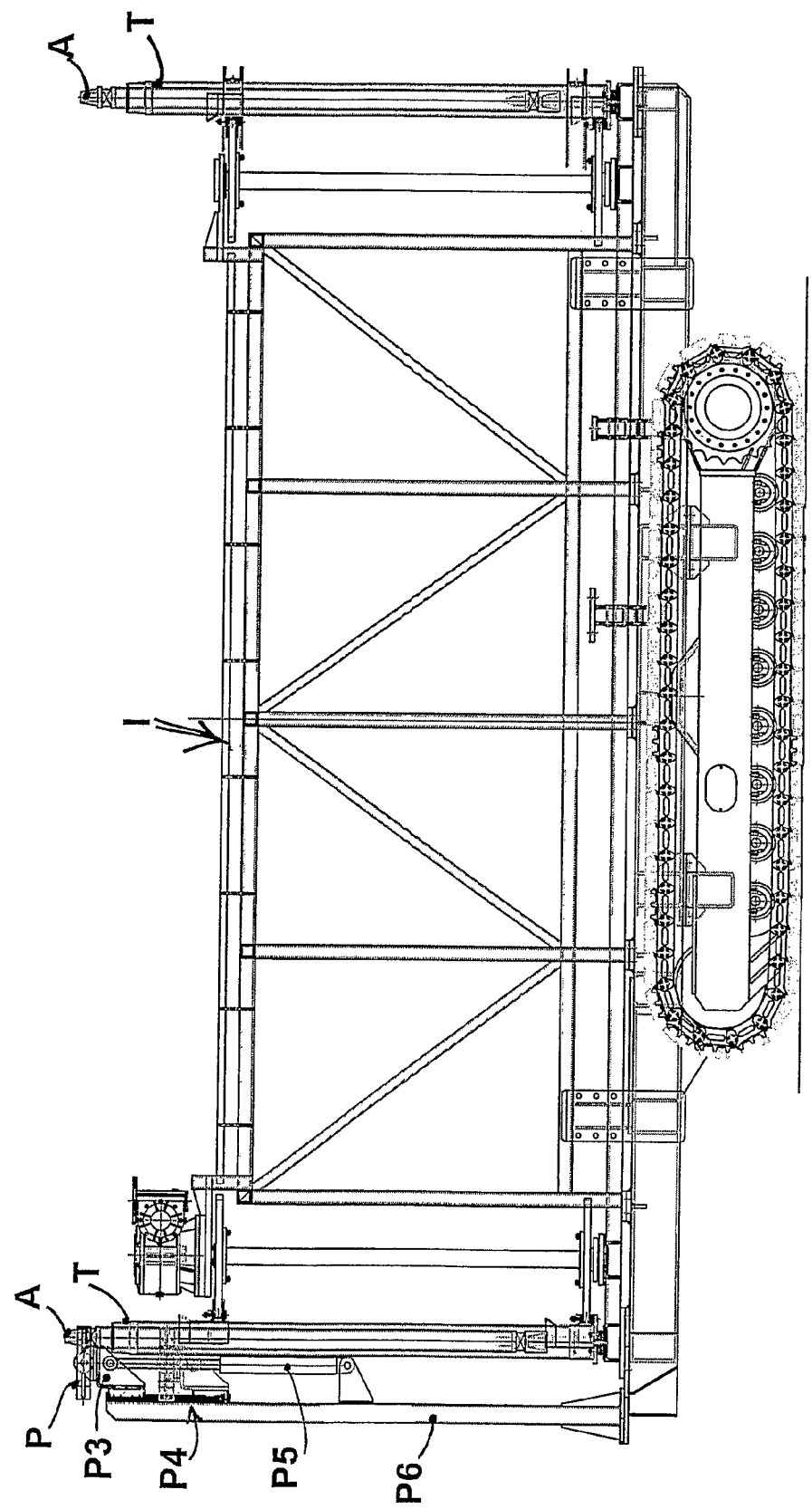
Figure 9A:
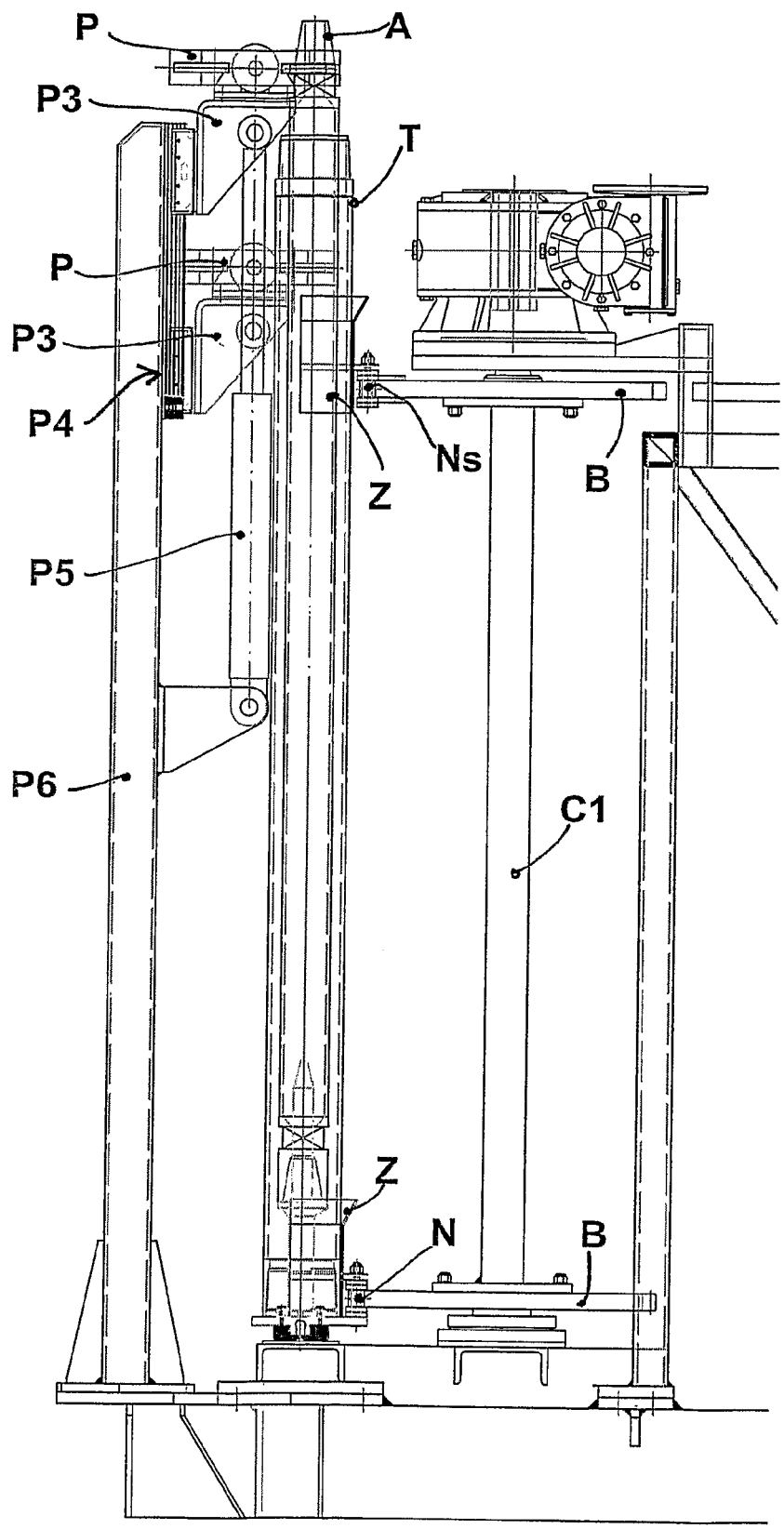

FIG. 9 shows a side view of the loader (C) with the clamp (P) and the supporting system (P3, P4, P5, P6) for supporting and transferring said clamp (P), also illustrated in detail in FIG. 9a.

The new drilling machine basically comprises a compact machine body with a loader (C) of the carousel or revolving type, which in turn comprises a platform (S) for supporting and slidingly transferring the drill stems and shroud tubes.

The new drilling machine also comprises at least one mast (M), placed in a lateral position with respect to said loader (C) and complete with at least one main rotary operating head (R1) for the coupling, alignment and rotation of the drill stems, plus at least one auxiliary rotary operating head (R2) for the coupling, alignment and rotation of the shroud tubes.

Said operating heads (R1, R2) are aligned vertically so as to center said drill stem and said shroud tube in relation to one another.

Said drill stem, like known drill stems, basically consists of various segments, or drill stem modules (A), which are coupled together by means of threaded screw connections.

Likewise, said shroud tube also consists basically of several segments, called shroud tube modules (T), that are screwed one into the other.

For said purpose, each of said drill stem modules (A) and each of said shroud tube modules (T) preferably comprises a male end (A1, T1) threaded on the outside and an opposite female end (A2, T2) threaded on the inside.

Figure 1:
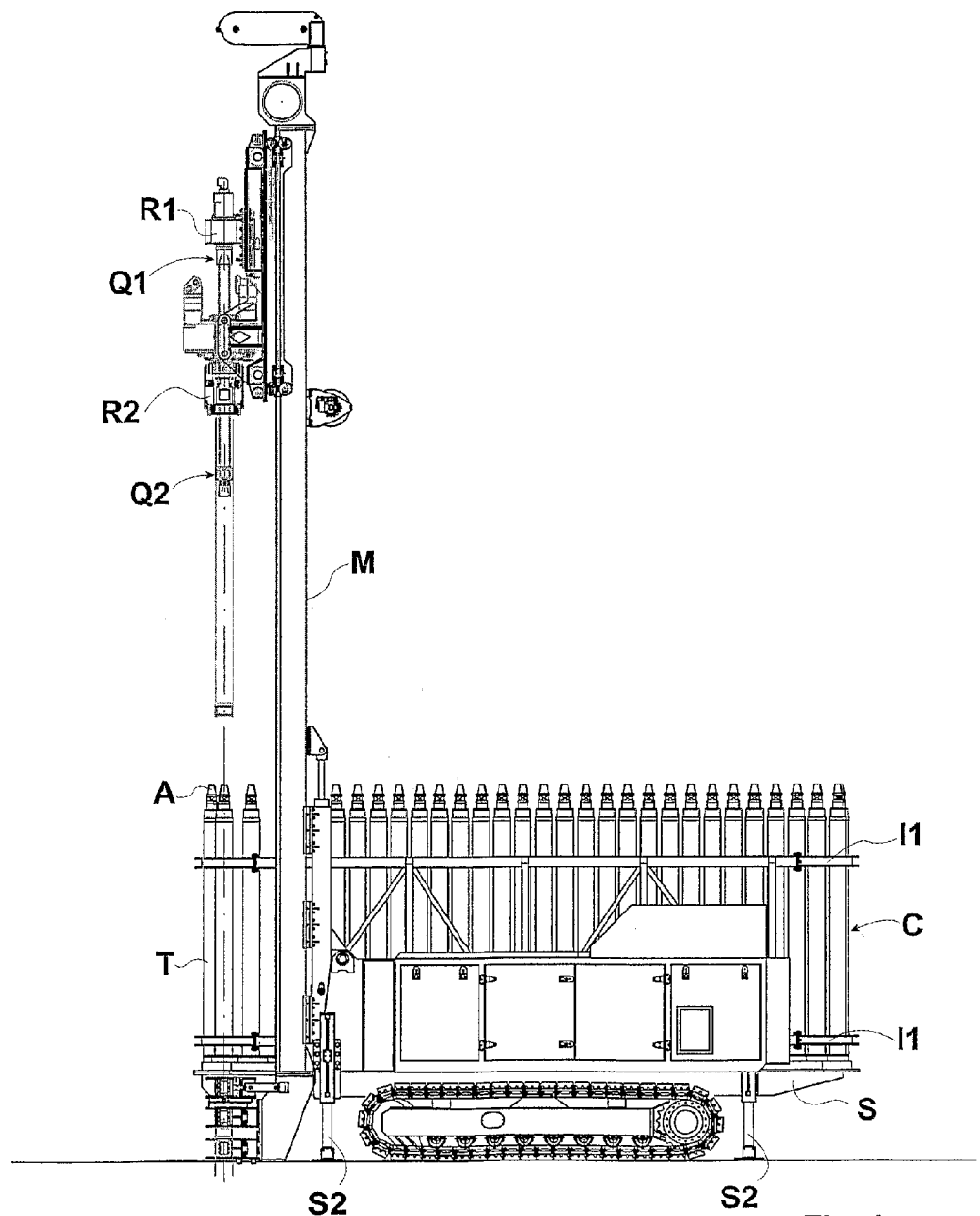
FIG. 1 shows a side view of the new drilling machine.
Figures 2A, 2B:
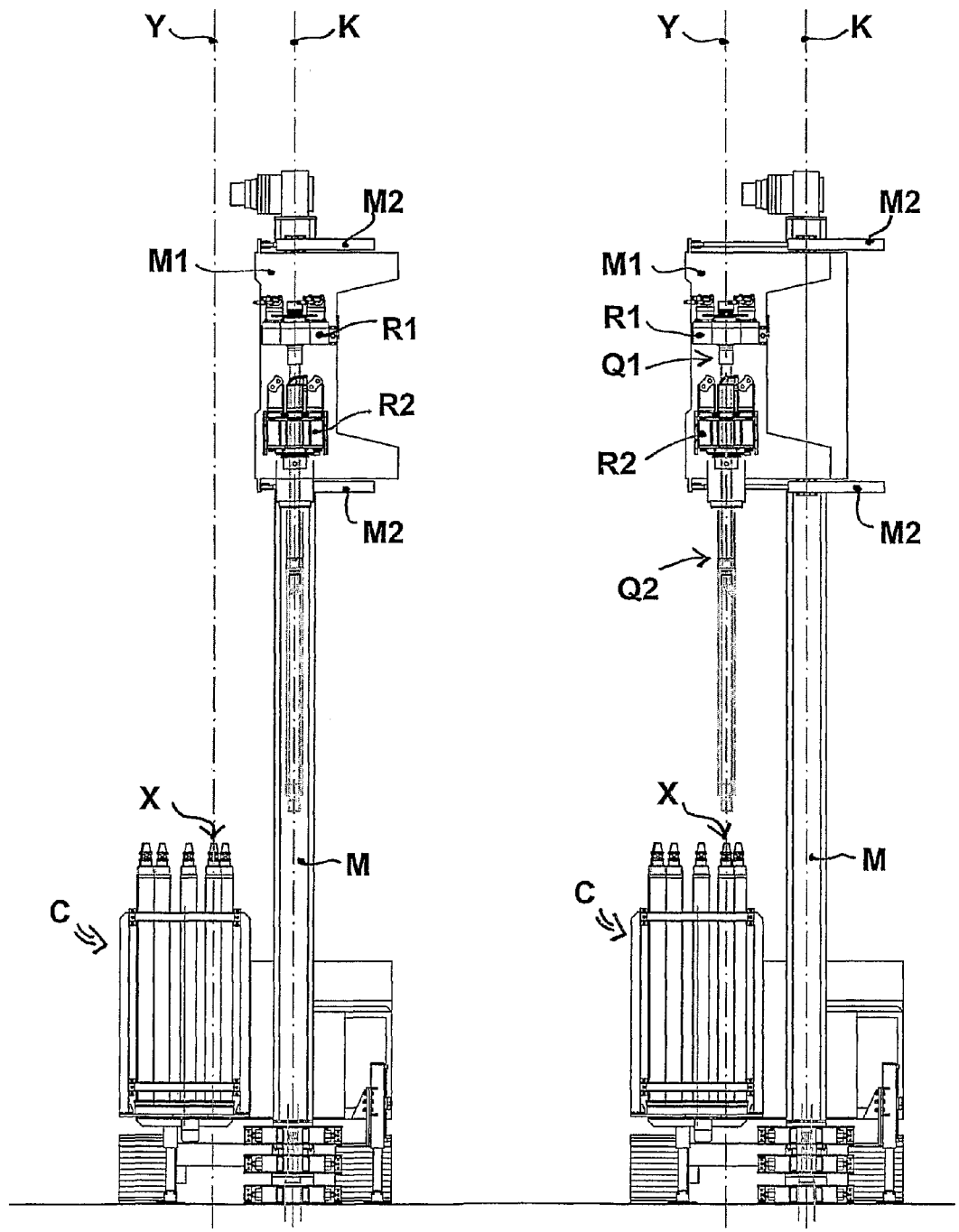
FIGS. 2a and 2b show front views of the present invention, with operating heads (R1, R2) respectively centered (K) with the mast (M) in FIG. 2a, and centered (Y) with the position (X) for the collection of the drill stem module (A) and shroud tube module (T) in the loader (C) in FIG. 2b.
Figure 3:
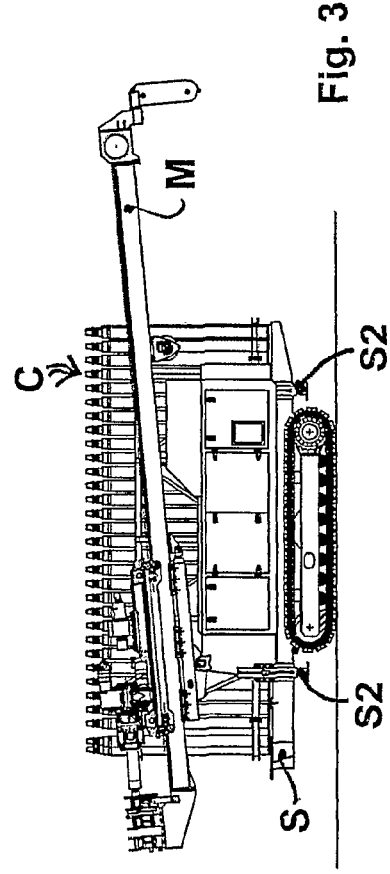
FIG. 3 shows the new drilling machine in the position it occupies when not in use.

Said mast (M) rotates in the vertical plane and can occupy a tilted position with respect to said platform (S), when not in use, as shown in FIG. 3, or a working position, i.e. perpendicular to said platform (5), as shown in FIG. 1.

Said operating heads (R1, R2) slide vertically along said mast (M) and are solidly attached to at least one trolley (M1), which slides horizontally along suitable rails (M2), which are also solidly attached to said mast (M).

Said operating heads (R1, R2) can consequently be displaced horizontally from the position (K) centered with said mast (M) to the position (Y) centered with the position (X) for the collection of said drill stem modules (A) and shroud tube modules (T) inside said loader (C).

Each of said operating heads (R1, R2) comprises at least one chuck or female coupling (Q1, Q2), for the insertion and coupling of the upper male end (A1) of the drill stem module (A) and of the upper male end (T1) of the shroud tube module (T), respectively.

The carousel device (C) for loading drill stem modules (A) and shroud tube modules (T) comprises at least one, or preferably two sliding belts or chains (N, Ns) forming a ring and kept taut between two or more tensioning shafts or pins (C1, C2) that are solidly attached perpendicular to said platform (S).

To be more precise, the new drilling machine is designed so as to have one of said chains (N) situated in the vicinity of said platform (S) and another chain (Ns) situated at an intermediate height.

Said sliding belts or chains (N, Ns) are arranged in a preferably horizontal position, i.e. parallel to said platform (S).

Distributed evenly along their outer surface, said sliding belts or chains (N, Ns) comprise a plurality of rods, forks or sockets (Z), or other seats suitable for retaining said shroud tube modules (T) in a vertical position, each containing a corresponding drill stem module (A).

According to the embodiment illustrated in the figures, each drill stem module (A) and shroud tube module (T) are consequently coupled and inserted in the same fork or socket (Z), in a position perpendicular to said platform (S).

The present invention also comprises one or more jacks (S2) suitable for positioning said platform (S) horizontally when in use, so that said drill stem modules (A), said shroud tube modules (T) and said mast (M) occupy a vertical position.

Said tensioning shafts or pins (C1, C2) rotate around their vertical axis and thereby induce the rotation of one or more geared wheels (B) solidly attached thereto.

The rotation of said tensioning shafts or pins (C1, C2) and said geared wheels (B) makes said sliding belts or chains (N, Ns) slide and consequently transfer said shroud tube modules (T), together with the corresponding drill stem modules (A) contained therein.

During the sliding motion of said sliding belts or chains (N, Ns), said shroud tube modules (T) and drill stem modules (A) are retained in a position perpendicular to said platform (S), and are transferred along the perimeter of the ring identified by said sliding belts or chains (N, Ns).

In order to maintain the vertical position of said shroud tube modules (T) and drill stem modules (A), said loader (C) also comprises an outer containment frame (I), complete with one or more lateral containment rings or walls (I1), and one or more lateral supporting uprights (I2).

When in use, said mast (M) remains fixed in a position perpendicular to said platform (S), while said operating heads (R1, R2) slide horizontally with said trolley (M1), being transferred from the position (K) centered with said mast (M) to the position (Y) centered with a given pickup position (X) inside the loader (C), where said chuck (Q1) on the main operating head (R1) is screwed onto the upper male end (A1) of the drill stem module (A), while the chuck (Q2) on the auxiliary operating head (R2) is screwed onto the upper male end (T1) of the shroud tube module (T).

Said loader (C) for the new drilling machine also comprises at least one device or clamp (P) for holding the drill stem modules (A) and/or shroud tube modules (T) that, in said pickup position (X), engage and retain said drill stem module (A) and/or said shroud tube module (T) while the corresponding operating head (R1) or (R2) is being screwed into place.

Said clamp (P) preferably comprises a fixed main body (P1) to which at least one pair of jaws (G1, G2) for gripping and retaining said drill stem module (A) and/or said shroud tube module (T) are hinged in at least in one point (G3), and wherein said jaws (G1, G2) are mobile, i.e. they are opened and closed by the translation of the cylinder (P1).

The translation of the stem (P2) induces the translation of the arms (H1, H2) and the consequent rotation of said jaws (G1, G2) around the hinge (G3).

Said jaws (G1, G2) have a concave surface of contact with the walls of said drill stem modules (A) and/or shroud tube modules (T) that has at least two different curvatures (V1, V2). To be more precise, the surface closer to the hinge (G3) has a greater curvature (V1), its radius of curvature being similar to the radius of the circular cross-section of the shroud tube module (T). The surface further from said hinge (G3) has a lesser curvature (V1), its radius of curvature being similar to the radius of the cross-section of the drill stem module (A), which is smaller than the radius of the cross-section of said shroud tube module (T).

Said clamp (P) is also preferably capable of translation in a direction parallel to said drill stem modules (A) and/or shroud tube modules (T) inserted in the loader (C).

Said clamp (P) thus grips said drill stem module (A) in the vicinity of its male end (A1) while the corresponding operating head (R1) is screwed into place, and can also move vertically downwards to grip said shroud tube module (T) while the operating head (R2) is screwed into place.

For said purpose, said clamp (P) comprises specific mobile supporting elements (P3), e.g. connected to pistons (P5) or sliding on rails (P4) on uprights (P6) solidly attached to the loader (C).

Each of said operating heads (R1, R2) thus ensures the centering and connection of said drill stem module (A) and said shroud tube module (T) with the drill stem modules and shroud tube modules already driven into the ground.

Said main operating head (R1) imposes a rotary downward movement on the drill stem module (A) and the drilling operation proceeds.

The collection of said shroud tube module (T) and corresponding drill stem module (A) from the pickup position (X) inside the loader (C) is followed by the controlled rotation of said shafts (C1, C2), which induce the sliding movement of said sliding belts or chains (N, Ns) and the transfer of the shroud tube modules (T) and drill stem modules (A) inserted in the corresponding forks or sockets (Z).

Another shroud tube module (T) and corresponding drill stem module (A) are thus brought into the pickup position (X), ready for subsequent collection.

Said rotation of the shafts (C1, C2) is preferably such that said forks or sockets (Z), complete with the corresponding shroud tube modules (T) and coupled drill stem modules (A), are displaced by only one step.

In other words, the shroud tube module (T) occupying the pickup position (X) is always inserted in the fork or socket (Z) adjacent to the one from which the previous shroud tube module was collected.

The operation for the collection of said shroud tube modules (T) and drill stem modules (A) is repeated in exactly the same way as the drilling goes deeper and necessitates the insertion of further drill stems and shroud tubes.

After completing the drilling process, said drill stem modules (A) and shroud tube modules (T) have to be withdrawn from the ground.

During this stage, all the drill stem modules (A) are withdrawn first, before all the shroud tube modules (T).

To be more specific, the main chuck (Q1) grips the upper end (A1) of the last drill stem module (A) driven into the ground, which is withdrawn completely from the well and disconnected from the adjacent drill stem module (A), which is still partially inserted in the ground.

After said drill stem module (A) has been pulled out of the ground, said main operating head (R1) is translated horizontally with said trolley (M1) until it is centered with said pickup position (X) and slides downwards along the mast (M) to return the drill stem module (A) removed from the well to the empty fork or socket (Z) in the pickup position (X).

After replacing said drill stem module (A), said shafts (C1, C2) of the loader (C) begin to turn and consequently induce the sliding motion of said sliding belts or chains (N, Ns), so as to bring an empty fork or socket (Z) into said pickup position (X), in which to insert the next drill stem module (A) withdrawn from the ground.

After all the drill stem modules (A) have been pulled out of the ground, the shroud tube modules (T) are withdrawn in the same way as described above.

The auxiliary chuck (Q2) grips the upper end (T1) of the last shroud tube module (T) driven into the ground, which is withdrawn from the ground and disconnected from the adjacent shroud tube module.

Said shroud tube modules (T) are then replaced in the forks or sockets (Z) which come into the pickup position (X) and which already contain one of the previously-withdrawn drill stem modules (A).

To enable the next shroud tube module (T) to be placed back in the loader, said shafts (C1, C2) are turned one step in the direction opposite to the one in which they were previously moved to enable the loading of the drill stem modules (A).

Said pickup position (X) is thus occupied by the forks or sockets (Z) containing one of the previously-recovered drill stem modules (A), over which the shroud tube module (T) withdrawn from the well can be placed.

When said drill stem modules (A) and/or said shroud tube modules (T) are put back in the loader (C), said clamp (P) again grips the drill stem module (A) and/or shroud tube module (T) located in the pickup position (X), while the corresponding operating head (R1) or (R2) is unscrewed therefrom.

Each of said shroud tube modules (T) and drill stem modules (A) placed in the carousel loader (C) is supported by suitable supporting means, illustrated in FIGS. 6 and 6a, comprising at least one lower supporting post (W) and one or more sockets or forks (Z) for lateral support and guidance, attached to said belts or chains (N, Ns). Said post (W) rests on and is solidly attached to a plate or plane (D) sliding on the upper surface (S1) of said platform (S), as described and claimed below.

Said post (W) is designed to fit into the lower female end (A2) of the corresponding drill stem module (A) and has an area of enlarged cross-section (W1) midway along its length so as to support said drill stem module (A) in a higher position than the corresponding shroud tube module (T) placed over said drill stem module (A).

In fact, said shroud tube module (T) rests directly on said plate or plane (D), so the upper male end (A1) of said drill stem module (A) extends beyond the upper male end (T1) of said shroud tube module (T) and is consequently accessible for the connection of said chuck (Q1) on the main operating head (R1) during the collection and return of the modules.

The present intervention preferably comprises two of said forks or sockets (Z), one of which is solidly attached to said plate or plane (D) and one is situated at an intermediate height and attached to said belt or chain (Ns).

Said plate or plane (D) comprises one or more underlying elements (D1) for sliding on said surface (S1).

Said sliding elements (D1) are made of a friction- and wear-proof synthetic material, e.g. nylatron, or other material with comparable physical and mechanical features.

Thus, with reference to the previous description and attached drawings, the following claims are made.

The invention claimed is:

1. A well drilling machine comprising:
   a machine body having a mast fitted with one or more rotary operating heads having chucks for a downward rotation of one or more of a drill stem module or shroud tube module;
   a carousel loader of drill stem modules and shroud tube modules, wherein one of said drill stem modules is inserted inside each of said shroud tube modules in a substantially coaxial position;
   a lower platform, on which said drill stem modules and said shroud tube modules come directly or indirectly to bear in a position substantially perpendicular thereto, and
   one or more lacks for bringing said platform into a substantially horizontal position,
   wherein said loader comprises a plurality of rods, forks, sockets, or seats, suitable for inducing a forward transfer of said shroud tube modules and corresponding drill stem modules in a substantially vertical position, said seats being solidly attached to one or more belts or chains sliding between one or more tensioning pins or shafts solidly attached to said platform, and wherein a rotation of said pins or shafts directly or indirectly induces a sliding motion of said belts or chains and translation of said rods, forks, sockets, or seats, and thereby of said shroud tube modules and drill stem modules carried thereon.

2. The drilling machine according to claim 1, wherein the one or more rotary operating heads are a plurality of rotary operating heads that comprise at least two rotary operating heads for drilling purposes, wherein at least a first one of said main rotary operating heads is for collecting and returning said drill stem module in a given pickup position inside the loader, and at least a second one of said rotary operating heads, situated below said first operating head, is for collecting and returning said shroud tube module in said given pickup position inside the loader, and wherein said operating heads keep said drill stem module and shroud tube module centered with one another.

3. The drilling machine according to claim 2, wherein each of said operating heads is solidly attached to at least one trolley sliding horizontally along rails, said rails being configured to slide vertically up and down said mast, such that said operating heads are transferrable from a first position, where they are centered with a well being drilled, to a second position, where they are centered with said pickup position, and vice versa.

4. The drilling machine according to claim 2, further comprising at least one device or clamp for holding one or more of said drill stem modules or said shroud tube modules, wherein said at least one device or clamp engages and retains one or more of said drill stem module or said shroud tube module in said pickup position during screwing and unscrewing of one of the chucks on one of the operating heads.

5. The drilling machine according to claim 4, wherein said device or clamp comprises a cylinder, to which at least one pair of jaws for gripping and retaining said drill stem module or said shroud tube module is hinged in at least one point, and wherein said jaws are configured to be opened and closed by rotation about said cylinder.

6. The drilling machine according to claim 5, wherein said jaws have a concave surface of contact with outer walls of said drill stem modules or shroud tube modules, the contact surface having at least two different curvatures, at least one of which has a radius of curvature similar to a radius of a circular cross-section of the shroud tube module, and at least one other of which has a radius of curvature similar to a radius of a circular cross-section of the drill stem module.

7. The drilling machine according to claim 4, wherein said clamp moves in a direction parallel to said drill stem modules and shroud tube modules inserted in the loader, such to grip either said drill stem module in a vicinity of a male end thereof, which extends from the shroud tube module where said drill stem module is inserted, or said shroud tube module.

8. The drilling machine according to claim 7, wherein said clamp is operatively connected to one or more of pistons or sliding on rails on uprights solidly connected to said loader.

9. The drilling machine according to claim 2, wherein, after collection of said drill stem module or shroud tube module from said loader, said belts or chains slide forward, thereby moving the shroud tubes and stems thereof to bring another shroud tube module and stem thereof into said pickup position.

10. The drilling machine according to claim 2, wherein, after returning at least one of said drill stem modules or shroud tube modules into line with said pickup position in the loader, said belts or chains are slidingly translated such to bring one of the forks, sockets, or seats, that is empty or contains only a drill stem module into said pickup position.

11. The drilling machine according to claim 1, wherein said carousel loader comprises an outer containment frame providing lateral support for said shroud tube modules and drill stem modules (A).

12. The drilling machine according to claim 11, wherein said outer containment frame comprises one or more lateral containment rings or walls and one or more supporting uprights.

13. The drilling machine according to claim 1, further comprising one or more supporting plates or planes with, on an upper surface thereof, a plurality of solidly-attached posts, wherein each of the posts is suitable for supporting one of said drill stem modules with a corresponding shroud tube module, and for holding the one of said drill stem modules and the corresponding shroud tube module in a substantially vertical position, and wherein said supporting plates or planes include sliding means that enable a sliding of said platform on a surface of said supporting plates or planes.

14. The drilling machine according to claim 13, wherein said sliding means is provided by means made of a synthetic material having elevated mechanical strength and wear resistance.

15. The drilling machine according to claim 13, wherein each of said posts includes at least one area of enlarged cross-section or a projection, situated midway up the post, such to support a bottom end of said drill stem module in a higher position than a coaxial shroud tube module, in which said drill stem module is inserted.

* * * * *